July 23, 1968  L. E. WRIGHT  3,393,897
BARRIER
Filed July 26, 1966
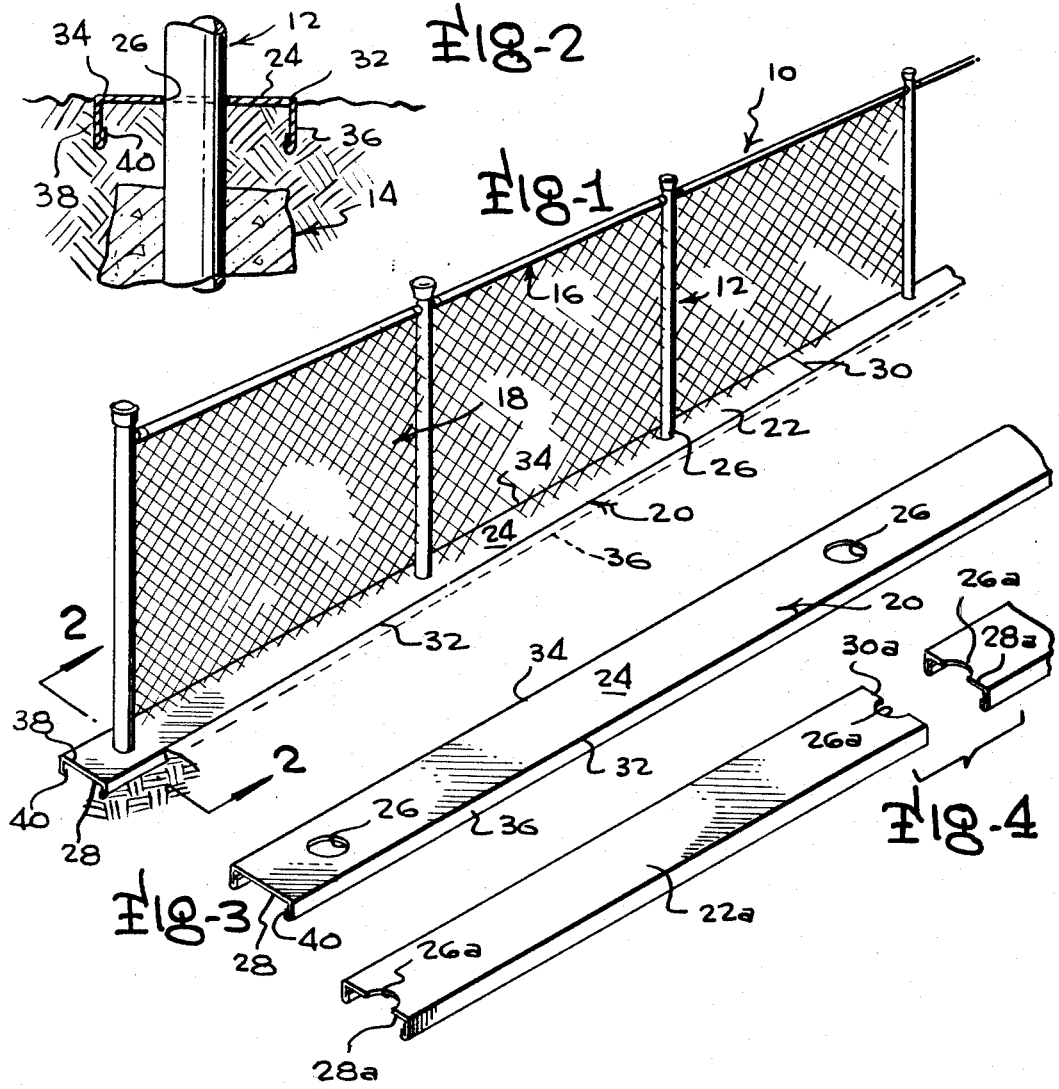
INVENTOR
LYLE E. WRIGHT
Robert D. McMorrow
ATTORNEY

United States Patent Office 3,393,897
Patented July 23, 1968

3,393,897
BARRIER
Lyle E. Wright, P.O. Box 67, Lanham, Md. 20801
Filed July 26, 1966, Ser. No. 567,901
1 Claim. (Cl. 256—32)

ABSTRACT OF THE DISCLOSURE

A metallic barrier for use in combination with a fence or post structure to prevent the growth of vegetation below and about the structure, the barrier including horizontal wall means disposed adjacent the structure and having vertical outer walls which are imbedded in the ground.

---

The present disclosure is directed to means underlying a fence or surrounding a fence post to prevent the growth of vegetation thereabout.

This invention pertains to barriers or shields to prevent the growth of vegetation in areas underlying and adjacent to fences, sign posts, building walls and the like, which are difficult to mow with conventional mowing equipment.

In the maintenance of lawns, a problem exists as to the cutting of the lawn in areas adjacent to structures such as fences. Often, trimming of the grass beneath the fence involves special equipment and/or labor, and is difficult to perform even with special equipment. Special chemical solutions, intended to inhibit the growth of vegetation in such areas have been proposed, but have failed to find general acceptance. Vertically disposed barriers have also been supplied to limit the spread of vegetation by root growth, but these vertically arranged barriers have no effect on the surface ground area on either side thereof.

A basic object of this invention resides in the provision of a grass shield or barrier which functions to positively prevent the growth of vegetation thereunder by substantially covering the area where the absence of vegetation is desired. A related object is to provide the combination of a fence having spaced apart post means, and a barrier extending beneath the fence and engaged about the post means.

Another objective of the invention concerns the provision of grass growth prevention means which is attractive and enhances the appearance of a fence or the like.

Still another advantage of the invention is that of providing means as aforesaid optionally installed either at the time the fence is erected, or added as an accessary to existing fences.

Yet another objective is to provide a surrounding shield or barrier for use with an upstanding element such as a sign post, fence post, or the like to prevent the close growth of vegetation.

Other and further objects and advantages of the invention will become apparent to those skilled in the art from a consideration of the following specification when read in conjunction with the annexed drawings, in which:

FIGURE 1 is a perspective view showing a section of fence with a barrier constructed and assembled in accordance with the teachings of this invention in place thereunder;

FIGURE 2 is an enlarged sectional view taken substantially on the section line 2—2 of FIGURE 1, looking in the direction of the arrows;

FIGURE 3 is a perspective view showing a section of one type of barrier hereof; and FIGURE 4 is a view similar to FIGURE 3, showing a modification.

Referring to the drawing in more detail, in FIGURES 1 and 2, a typical fence construction 10 is shown, wherein the fence comprises upstanding posts 12 imbedded in the ground as in masses of concrete 14. The posts 12 are interconnected by top rails 16 and fencing, such as chain link sections 18, is suitably connected thereto.

The first form of barrier hereof is generally designated in the drawing by reference numeral 20, and is shown in FIGURES 1 through 3. The barrier 20 is installed at the time of construction of the fence as a part thereof, and comprises a plurality of elongated sections 22 each having a substantially flat top wall 24 arranged for horizontal installation substantially at ground level as shown in FIGURE 2. The wall 24 is disposed beneath the fence and extends outwardly from each side thereof to a predetermined distance dictated by mowing requirements, the entire barrier construction being formed metal or other material substantially impervious to the passage of vegetation therethrough, and serving to exclude light and air from the ground immediately beneath it. At spaced intervals, the wall 24 has openings 26 formed therein to receive the posts 12 therethrough as shown in FIGURE 2, and the wall sections terminate at ends 28 and 30 abutted against one another in use. Formed integrally or otherwise fixed to each of the side edges 32 and 34 of the wall are vertical walls 36 and 38. The vertical walls have reverted, rigidifying flanges 40 along their distal edges and are imbedded in the ground to prevent the spread of root structure beneath the wall 24 and to anchor the barrier firmly in place.

In the modification of FIGURE 4, sections 22a of the shield have cut-outs 26a formed at their ends 28a and 30a and are imperforate therebetween. The distance between the cut-out portions 26a of each section is set to correspond to the distance between the posts 12 of a previously installed fence, and the cut-outs are shaped to correspond to that of the posts, and thus, the sections 22a are readily installed with existing fences.

Having described and illustrated several embodiments of the invention in some detail, it will be understood that these descriptions and illustrations are offered only by way of example, and that the invention is to be limited in scope only by the appended claim.

What is claimed is:
1. The combination, with a fence construction installed above an area wherein vegetation is adapted to grow, the fence construction including a plurality of spaced-apart, vertical posts in longitudinal alignment, and including a vertical fence element suspended on the posts above said area, of a barrier to restrict the growth of vegetation beneath the fence and about the posts, the barrier comprising:

an elongated, substantially rectangular horizontal wall of thin sheet material;

the horizontal wall being disposed above ground level and extending beneath the fence for a distance such that it encompasses a plurality of the posts;

the horizontal wall comprising a plate elongated to extend a distance of at least said plurality of the posts and having side portions extended laterally on opposite sides of the fence element throughout said distance;

the side portions terminating in side edges;

an imperforate vertical wall of said thin sheet material integrally connected to each of the side edges, the vertical walls being embedded in the ground and extending in substantially right angular relation to the horizontal wall to a depth to prevent the growth of vegetation thereunder; and the horizontal wall having openings formed therein at spaced intervals, one of the posts being extended through each of said openings.

References Cited

UNITED STATES PATENTS

| 1,139,515 | 5/1915 | Haas | 52—102 |
| 1,195,697 | 8/1916 | Lord | 52—102 |
| 2,826,393 | 3/1958 | Miller | 256—19 |
| 2,978,837 | 4/1961 | Daniels | 47—25 |

DAVID J. WILLIAMOWSKY, *Primary Examiner.*

D. L. TAYLOR, *Assistant Examiner.*